UNITED STATES PATENT OFFICE.

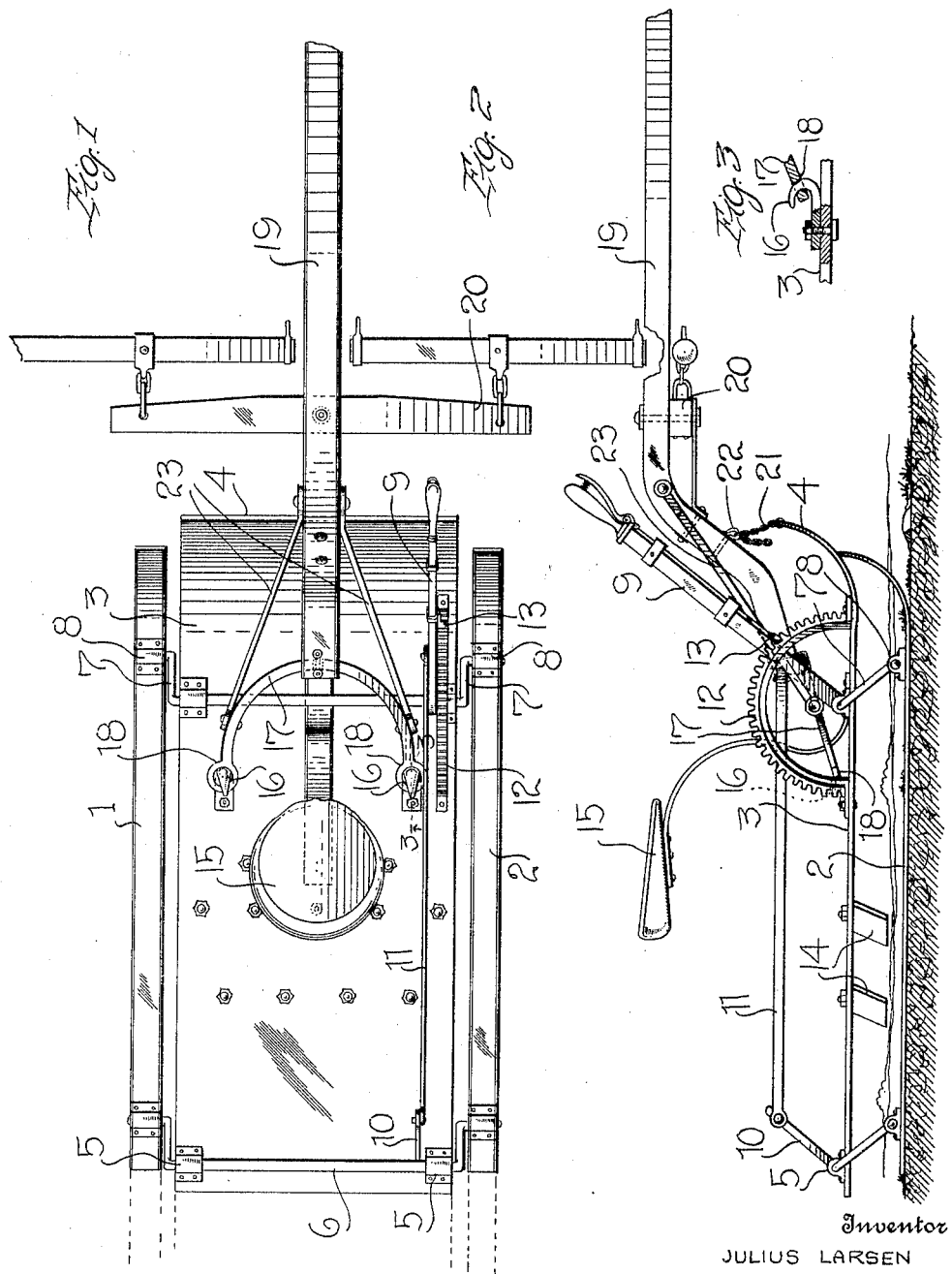

JULIUS LARSEN, OF DEER LODGE, MONTANA.

SOD-CUTTER.

1,099,607. Specification of Letters Patent. Patented June 9, 1914.

Application filed October 29, 1913. Serial No. 798,116.

*To all whom it may concern:*

Be it known that I, JULIUS LARSEN, a citizen of the United States, residing at Deer Lodge, in the county of Powell and State of Montana, have invented certain new and useful Improvements in Sod-Cutters, of which the following is a specification, reference being had to the accompanying drawings.

This invention relates to new and useful improvements in sod cutters and more particularly to an improvement on my former Patent Number 1,007,459 and the primary object of the invention is to provide a device of this character in which the draft will be applied directly to the platform of the device.

A still further object of the invention resides in providing a device wherein connection is provided between the tongue and the movable platform to prevent turning over of said platform when the device meets obstructions in the path of travel thereof.

With these and other objects in view, the invention consists in the novel features of construction, combination and arrangement of parts as will be hereinafter referred to and more particularly pointed out in the specification and claims.

In the accompanying drawing forming a part of this application, Figure 1 is a plan view of the device. Fig. 2 is a side elevation thereof; and Fig. 3 is a section as seen on line 3—3, of Fig. 1.

In describing my invention, I shall refer to the drawing in which similar reference characters designate corresponding parts throughout the several views and in which 1 and 2 indicate runners of the usual or any preferred type used in such machines, the forward ends thereof being curved upwardly, and designed for operation between the runners 1 and 2, is a platform or body 3, the forward end of which is also bent upwardly, as shown at 4. Mounted to oscillate in bearings 5 on the top face of said platform adjacent the forward and rear edges thereof, and extending transversely of said platform, are the rods or shafts 6, the ends of which are bent to form cranks 7 projecting beyond the side edges of said platform. These crank portions 7 on the shafts or rods 6 are mounted for oscillation in bearings 8 carried on the runners 1 and 2 adjacent the front and rear ends thereof. These rods or shafts 6, designed and secured as described, form substantial crank shafts whereby said body or platform 3 may be raised and lowered with respect to the runners and in order to provide for the raising and lowering of said platform, a lever 9 is secured at its lower end to the shaft or rod 6 adjacent the forward end of the platform. A crank arm 10 is similarly secured or formed on the rear transverse shaft or rod 6, while a connecting rod 11 is pivotally engaged with the free end of said crank arm 10 and said lever 9 adjacent the lower end of the latter. From this construction, it will be seen that when the lever 9 is moved in one direction, said platform 3 may be raised above the surface of the ground, and in order to retain said platform in any adjusted position, with respect to the surface of the ground, an arcuate rack 12 is provided on the platform adjacent said lever, while a spring held detent 13 is carried on said lever for engagement with the teeth of the rack.

Knife blades 14 are removably secured to the platform 3 in rows and arranged in staggered relation with respect to one another. These blades are identical to the blades shown in my Patent Number 1,007,459, issued October 31st, 1911 and the depth of the cut of these blades may, obviously be adjusted by the adjustment of the aforesaid lever 9. A seat 15 is mounted on the forward end of the platform adjacent the lever 9, and it will be seen that the weight of the driver will be utilized in forcing the cutter or knife blades into engagement with the sod.

Bolted or otherwise removably secured to the upper face of the platform 4, on each side of the seat-post, are the hooks 16 and an arcuate bar 17 is provided, the ends of which are looped, as shown at 18 and engaged with said hooks 16. Removably secured to the arcuate bar 17, which projects forwardly of the seat, is a tongue 19 and suitably mounted on said tongue is a double-tree 20. Draft animals may be hitched to the double-tree and the device propelled over the sod and in order to prevent the platform 4 from attempting to turn over, should the same meet an obstruction in the path of travel thereof, a link chain 21 is engaged at its one end with the forward edge of the platform about centrally thereof. A hitch link 22 is provided on the inner end of the tongue 19 with which is adapted to be engaged a link of the chain 21. A portion of the chain is permitted to depend freely therefrom.

From the foregoing description of the construction of my improved device, the operation thereof will be readily understood and it will be seen that I have provided a sod cutter which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. In a device of the class described, the combination with a cutter carrying platform; of a draw-bar of arcuate design pivoted at its ends on said platform rearward of the front edge thereof, a tongue rigidly secured at its rear end to said draw-bar, and flexible connecting means between said tongue and the forward edge of said platform.

2. In a device of the class described, the combination with a cutter carrying platform, and a seat mounted thereon; of a pair of hook members removably secured to the platform, one on each side of the seat thereon, and rearward of the front edge of said platform, an arcuate draw-bar pivotally connected at its ends to said hook members and extending forward of said seat, a tongue secured at its rear end to the intermediate portion of said arcuate draw-bar, bracing means between said tongue and draw-bar, and a flexible connection between the tongue and the front edge of said platform.

In testimony whereof I hereunto affix my signature in the presence of two witnesses.

JULIUS LARSEN.

Witnesses:
HUMPHREY J. TOOMEY,
EARLE C. PRICE.

---

Copies of this patent may be obtained for five cents each, by addressing the "Commissioner of Patents, Washington, D. C."